Patented May 8, 1928.

1,668,959

UNITED STATES PATENT OFFICE.

HARRY LE B. GRAY AND CYRIL J. STAUD, OF ROCHESTER, NEW YORK, ASSIGNORS TO EASTMAN KODAK COMPANY, OF ROCHESTER, NEW YORK, A CORPORATION OF NEW YORK.

PROCESS OF MAKING CELLULOSE ACETATE.

No Drawing. Application filed February 17, 1926. Serial No. 88,932.

This invention relates to processes of making cellulose acetate. One object of the invention is to provide a process for making cellulose acetate which will yield films free from haze and graininess, even when the raw cellulose material is a cheap one that has heretofore been considered useless for producing cellulose acetates of high grade. Another object of the invention is to provide such a process in which the speed of acetylation is increased without impairing the product. Another object of the invention is to provide a process in which the raw cellulose material is given a preliminary treatment that makes possible subsequent rapid production from it of strong cellulose acetate free from haze and graininess. Still another object of the invention is to provide a process in which a preliminary acid treatment dissolves away from the cellulose those sugar anhydrides from which graininess develops, said dissolving being effected before the acid harmfully degrades the cellulose. Other objects will hereinafter appear.

Cellulose acetates, for the manufacture of photographic films and high-grade lacquers, should be free from haze when made into solutions and when deposited from such solutions. This haze, which has heretofore accompanied the acetylation of inexpensive raw cellulose materials, consists of particles so small that they pass through the filters ordinarily employed to purify solutions of cellulose acetate. It should, therefore, be avoided by improving the process of making the cellulose acetate rather than by treating solutions of hazy acetate.

Cellulose acetate solutions, and films deposited from them, should likewise be free from graininess. This trouble has been found to be due to particles which are gelatinized by, but are not soluble in, the usual solvents employed in connection with cellulose acetate. They cause weakness and irregularities in films. We have discovered that acetylated sugar anhydrides, produced from the sugar anhydrides in the cheap raw materials, are present in them. Such sugar anhydrides should, therefore, be removed from the cellulose material before acetylation, because they indubitably are factors in grain formation.

It is likewise desirable to activate the raw cellulose materials, so that they will be more susceptible to the acetylating baths, and thus shorten the time of acetylation. This is of importance commercially in reducing the cost of production. At the same time this activation must not be carried to a point where the cellulose will be degraded to yield cellulose acetate products of poor flexibility and strength.

We have found that we can utilize inexpensive raw materials, can properly activate them without harmful degradation, and can simultaneously prevent haze and graininess by giving such raw materials a preliminary treatment with sulfuric acid of the proper strength, removing the sulfuric acid from them, and acetylating them in a bath in which the catalyst or condensing agent is weaker than sulfuric acid,—that is, has less degrading action on cellulose and its compounds. It is a fortunate fact, which we have found, that sulfuric acid of proper strength has sufficient solvent power upon sugar anhydrides to separate them from the cellulose before it seriously degrades the latter. By removing the sulfuric acid and submitting the activated and purified material to an acetylating bath in which a weaker condensing agent or catalyst is employed, we preserve this freedom from serious degradation. It is an advantage of our process that the sulfuric acid may be drained off and used over and over again with successive batches of raw material, thus effecting important operating economies. We have discovered that the strength of acid which dissolves the sugar anhydrides at the temperatures employed is such that it may be readily removed from the cellulose. In other words, less washing is required to make the material neutral after using our acid, than after using weaker and unsuitable concentrations at higher temperatures. Weaker sulfuric acid at higher temperatures is held by the fibers much more tenaciously than is ours, at room temperature.

While practically all of the usual sources of cellulose may be employed as starting material, it is an especial advantage of our process that it can be used with cheap sources of cellulose such as cotton linters, cotton dust and sulfite pulp. We prefer to use aqueous solutions of sulfuric acid containing from 35% to 75% by weight of the acid. A good operating strength is 55%. The preliminary treatment with the acid can take place at room temperature, a useful range being between 20° and 30° C. Below 20° the action is prolonged without any compensating benefits and above 30° C., special watchfulness is required to avoid harmful degradation of the cellulose. The duration of the preliminary treatment will vary in accordance with the strength of the acid, the temperature and the nature of the raw cellulosic material. 24 hours may be considered a useful time; but tests can be made at intervals to determine whether the cellulose has become so degraded as to be excessively friable. The treatment should not reach this stage.

After the preliminary purifying and activating treatment with the sulfuric acid, the excess of the latter is removed by draining, pressing or centrifuging and the cellulose residue is then washed in successive changes of water. This is carried out until the mass is at least neutral to litmus. The litmus paper should be pressed into the wet cellulose to make a reliable test. There is no harm in continuing the washing somewhat after neutrality to litmus has been established. In fact, we do this in the preferred embodiment of our invention. The washing may be done with soft water, or even with moderately hard water, provided the latter does not have materials which will precipitate as insoluble particles. The washed material is finally dried in any usual or preferred manner.

The acetylation is then carried out by mixing the thus prepared cellulosic material in an acetylating bath containing a condensing agent or catalyst which is relatively weaker than sulfuric acid, such as the mixture of chlorine and red phosphorous, described in the application of William R. Webb and Carl J. Malm, filed October 7th, 1925, Serial No. 61,144, for process of making cellulose acetate. Zinc chloride is another suitable catalyst.

We shall now give, by way of illustration, one example of our invention, but it will be understood that our invention is not limited to the details thus set forth, except as indicated in the appended claims. Cotton dust, consisting of extremely short bleached fibers or particles, separated as a by-product from cotton linters and other similar materials, is immersed in an aqueous 55% (by weight) solution of sulfuric acid and kept therein at room temperature for twenty-four hours. The acid is then wrung out as far as possible from the cellulosic mass and the latter is washed with successive changes of water until it is neutral to litmus. It is then given one or two more changes of water to make certain that all parts of the mass have reached the neutral point. Then the mass is dried.

The dried material is stirred into an acetylating bath, such as that disclosed in the application of Webb and Malm, cited above, or in the bath described under the heading "Manufacture of cellulose acetate with zinc chloride", beginning in page 2598 of "Technology of Cellulose Esters" by Worden, Vol. VII, published in 1916 by D. Van Nostrand, New York city. Provided a mild condensing agent or catalyst is employed, the acetylating steps may be along conventional lines. Bleached sulfite wood pulp and cotton linters act satisfactorily when treated in the same way, sulfite pulp being a typical wood pulp, widely used and, therefore, readily available at small cost.

Having thus described our invention, what we claim as new and desire to secure by Letters Patent is:

1. The process of making cellulose acetate substantially free from haze and graininess which comprises treating cellulose material with an aqueous unesterifying bath containing 35% to 75% by weight of sulfuric acid, stopping the action before the cellulose is degraded, removing the acid from the material until the latter is at least neutral to litmus, and acetylating the material in a bath containing a catalyst weaker than sulfuric acid.

2. The process of making cellulose acetate substantially free from haze and graininess which comprises treating cellulose material containing sugar anhydrides with an aqueous unesterifying bath containing from 35% to 75% by weight of sulfuric acid, the action being carried on between 20° and 30° C., washing out the acid before the cellulose is degraded to an excessively brittle condition, said washing being continued at least until neutrality to litmus is obtained and drying the treated cellulose and acetylating it in a bath containing a weaker condensing agent than sulfuric acid.

3. The process of making cellulose acetate substantially free from haze and graininess which comprises treating cellulosic material with aqueous unesterifying sulfuric acid of 35% to 75% concentration (by weight) for 24 hours at room temperature, washing said material until it is at least neutral to litmus, drying said material, and acetylating it in a reaction mixture containing a weaker condensing agent than sulfuric acid.

4. The process of making from cellulose material, containing sugar anhydrides, cellulose acetate substantially free from haze and graininess and capable of forming strong, transparent, flexible films, which comprises the steps of simultaneously dissolving out said sugar anhydrides and activating the cellulose with unesterifying aqueous sulfuric acid, removing the acid from the material before the cellulose is degraded to the brittleness-inducing condition, bringing said activated material to at least neutrality to litmus, and acetylating said material in the presence of a catalyst having a less degrading effect on cellulose than sulfuric acid.

5. The process of making haze-free and graininess-free cellulose acetate from cotton dust which comprises soaking said dust in a 35% to 75% (by weight) unesterifying aqueous solution of sulfuric acid for 24 hours at a temperature between 20° and 30° C., removing the excess of acid, washing until said cotton is, at least, neutral to litmus, drying said cotton, and acetylating said cotton in a bath in which the condensing agent is weaker than sulfuric acid.

Signed at Rochester, New York, this 15th day of February 1926.

HARRY LE B. GRAY.
CYRIL J. STAUD.